Oct. 8, 1957
V. B. PHILLIPS ET AL
2,808,791
IMPLEMENT FOR TRANSFERRING FROZEN CONFECTIONS
FROM BULK INTO SMALL CONTAINERS
Filed Feb. 1, 1955
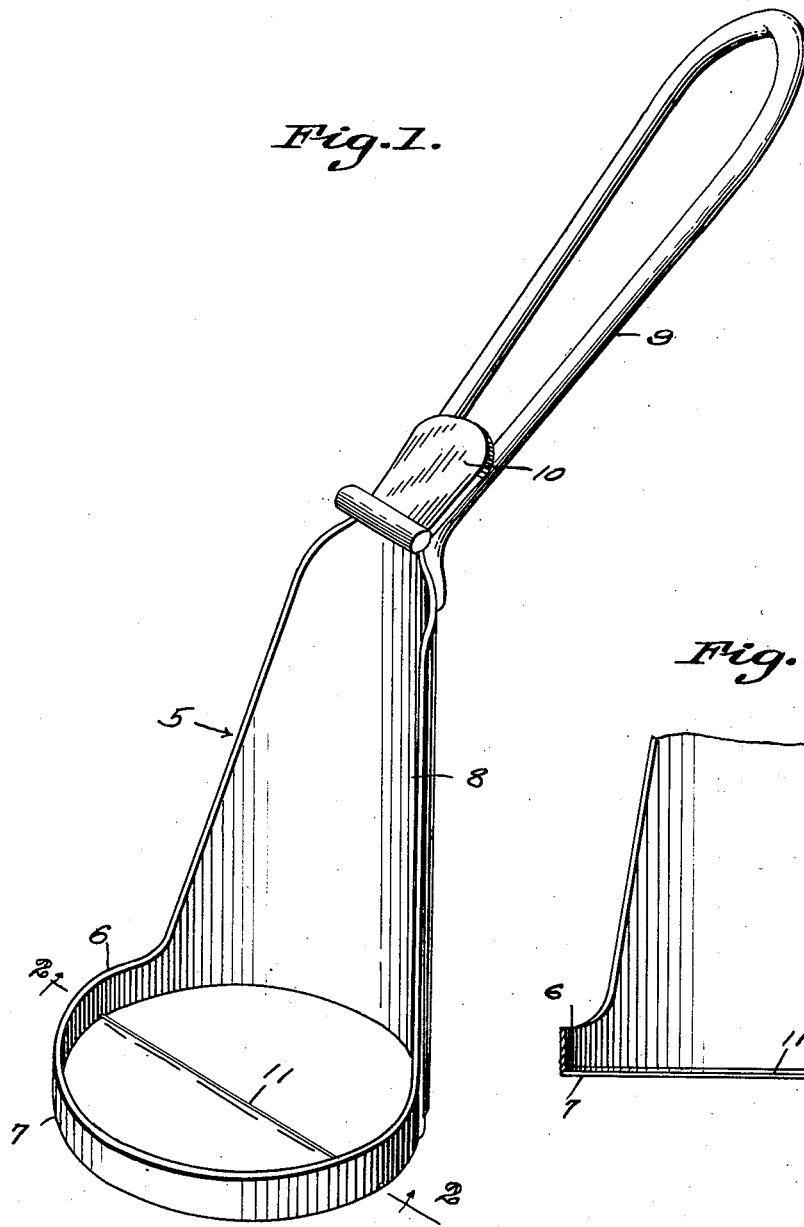
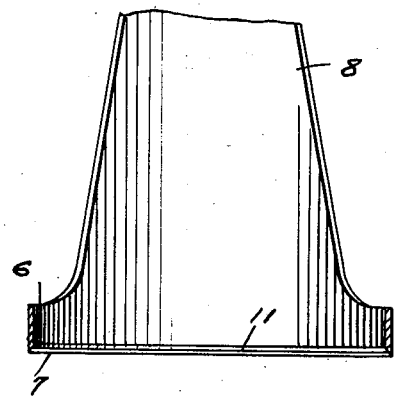
V. B. Phillips
J. G. Everett
R. P. Hoekema
INVENTORS.
BY C. A. Snow & Co.
ATTORNEYS.

United States Patent Office 2,808,791
Patented Oct. 8, 1957

2,808,791

IMPLEMENT FOR TRANSFERRING FROZEN CONFECTIONS FROM BULK INTO SMALL CONTAINERS

Vernon Beaumont Phillips, Jack Guy Everett and Roy Paul Hoekema, Spokane, Wash.

Application February 1, 1955, Serial No. 485,517

1 Claim. (Cl. 107—48)

This invention relates to an implement in the form of a scoop or dipper, designed for facilitating the transfer of ice cream or similar frozen confections from large containers or bulk, into small containers such as used in supplying small quantities of ice cream as sold for household or family consumption.

An important object of the invention is to provide an ice cream dipper or scoop having cutting means on the bottom thereof for cutting the ice cream at the bottom of the scoop from the bulk ice cream into which the scoop is forced in dipping or scooping a quantity of the bulk ice cream for transfer to small containers.

Still another object of the invention is to provide a scoop wherein the body portion above the cutting edge thereof is curved to provide a broad metal section to be used as a packing medium in packing and smoothing the top of the ice cream in the small container.

Other and further objects and advantages of the invention will be hereinafter described and the novel features thereof defined in the appended claim.

In the drawings:

Fig. 1 is a perspective view of an ice cream dipper or implement, constructed in accordance with the present invention.

Fig. 2 is a sectional view taken on line 2—2 of Fig. 1.

Referring to the drawing in detail, the implement comprises a body portion indicated generally by the reference character 5 which is preferably formed from a section of sheet metal material constructed to provide a band 6 formed with a cutting edge 7 to permit the body portion to be forced into the body of ice cream or frozen confection to be removed from the container in which the bulk ice cream is delivered to the store or shop to be sold to the retail trade.

Rising from one edge of the band 6 is a curved plate 8 which is wide at its lower end which merges with the band 6, and tapers towards the upper end of the plate 8. This plate is transversely curved to conform to the curvature of the band 6, the curvature of the plate 8 forming a continuation of the band 6, as better shown by Fig. 1 of the drawing.

Secured to and extending laterally from the upper end of the plate 8, is a handle 9 which is exceptionally rigid in formation, to withstand pressure necessary to be directed thereto in forcing the scoop or implement into the frozen confection to scoop the bulk ice cream from its container.

Also secured to the upper end of the plate 8, is the pressure plate 10 which is so located with respect to the handle 9, that the thumb of the hand gripping the handle 9 will fall directly over the plate 10 to facilitate the application of pressure at a point directly over the upper end of the plate 8 to cause the implement to be extended into the frozen confection or ice cream.

The reference character 11 indicates a heavy wire which has its ends connected to the band 6 at diametrically opposite points, dividing the area of the band into equal parts. This wire acts as a cutter cutting the frozen confection or ice cream as the implement is forced downwardly into the frozen confection or ice cream. It follows that when the implement has been forced into the frozen confection or ice cream, to the depth of the handle, the tool is rotated a half turn in either direction, resulting in the wire 11 cutting the quantity of ice cream confined in the implement or scoop, so that when the implement or scoop is lifted from the frozen confection or ice cream, the quantity of ice cream held within the implement or scoop will be removed from the bulk container and the ice cream may be readily transferred to a small container as required for retail trade. After the frozen confection or ice cream has been placed in the small container, the implement may be used as a paddle for forcing the frozen confection or ice cream in the container or in merely forcing the curved surface of the plate 8, against the ice cream or frozen confection, projecting above the top of the carton being filled with the implement.

From the foregoing and detailed disclosure, it is believed that the construction and operation of the implement or scoop form the subject matter of the present invention will be clear, and that further detailed disclosure is unnecessary.

While the specific details of one embodiment of this invention have been herein shown and described, the invention is not confined thereto as changes and alterations may be made without departing from the spirit and scope thereof as defined in the appended claim.

What is claimed is:

A scoop for removing frozen confections from a bulk container comprising a circular band of sheet metal forming a cutter having a lower cutting edge, a transversely curved plate integral with and rising from said cutter, the sides of said plate converging upwardly from said cutter and comprising a continuation thereof, the lower wide end of said body being of a radius of arc less than 180° and greater than 90°, an obtusely outwardly inclined handle comprised of a looped relatively rigid metallic rod fixed to the upper end of said body and extending from the outer convex side thereof, a pressure plate carried by the upper end of said body and overlying the upper side of the inner end of said handle, and a wire cutter fixed to and extending diametrically across said cutter in a direction perpendicular to a radius drawn to the center of the arc of said plate.

References Cited in the file of this patent

UNITED STATES PATENTS

| | | |
|---|---|---|
| 293,940 | Brock | Feb. 19, 1884 |
| 1,065,108 | Blaul | June 17, 1913 |
| 1,535,871 | Stahley | Apr. 28, 1925 |
| 2,012,637 | Ribley | Aug. 27, 1935 |
| 2,032,562 | Burns | Mar. 3, 1936 |
| 2,176,752 | Taggart | Oct. 17, 1939 |
| 2,256,769 | Amrine | Sept. 23, 1941 |
| 2,457,541 | Gilcrest | Dec. 28, 1948 |